(12) United States Patent
Traub et al.

(10) Patent No.: US 12,076,811 B2
(45) Date of Patent: Sep. 3, 2024

(54) DEVICE FOR LASER MACHINING WORKPIECES THAT ARE DIFFICULT TO ACCESS

(71) Applicant: Fraunhofer-Gesellschaft zur Förderung der angewandten Forschung e.V., Munich (DE)

(72) Inventors: Martin Traub, Wurselen (DE); Alexander Olowinsky, Aachen (DE); Arnold Gillner, Roetgen (DE); Andre Hausler, Aachen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 865 days.

(21) Appl. No.: 15/734,948

(22) PCT Filed: Jun. 3, 2019

(86) PCT No.: PCT/EP2019/064334
§ 371 (c)(1),
(2) Date: Dec. 3, 2020

(87) PCT Pub. No.: WO2019/233944
PCT Pub. Date: Dec. 12, 2019

(65) Prior Publication Data
US 2021/0229213 A1     Jul. 29, 2021

(30) Foreign Application Priority Data
Jun. 4, 2018 (DE) .................. 10 2018 208 752.0

(51) Int. Cl.
*B23K 26/03*     (2006.01)
*B23K 26/06*     (2014.01)
(Continued)

(52) U.S. Cl.
CPC ........ *B23K 26/032* (2013.01); *B23K 26/0643* (2013.01); *B23K 26/0648* (2013.01);
(Continued)

(58) Field of Classification Search
USPC ....................................................... 219/121
See application file for complete search history.

(56) References Cited

U.S. PATENT DOCUMENTS 7,618,415 B2    11/2009   Kessler et al.
2008/0314880 A1   12/2008   Geschwandner et al.
(Continued)

FOREIGN PATENT DOCUMENTS

DE      19619339     * 11/1996
JP      S6027487 A     2/1985
(Continued)

OTHER PUBLICATIONS

EP Office Action, dated Aug. 21, 2023, for corresponding European patent application No. 19 728 419.3, pp. 1-5.
(Continued)

*Primary Examiner* — Vy T Nguyen
(74) *Attorney, Agent, or Firm* — Tarolli, Sundheim, Covell & Tummino LLP (57) ABSTRACT

A device is provided for processing hard-to-access workpieces by means of an imaging optical path as well as a corresponding method for laser processing by means of this device, comprising a relay optical system with an optical axis passing through the relay optical system and a focusing unit arranged behind the same seen in the optical axis in the propagation direction of the imaging optical path, with a plurality of optical elements for generating a third focal length, as well as a beam scanner arranged before the first relay optical group seen in the propagation direction of the imaging optical path, which scanner is provided both as an
(Continued)

entrance pupil for the imaging optical path entering the first relay optical group and at least for deflecting the imaging optical path in relation to the optical axis.

16 Claims, 5 Drawing Sheets

(51) Int. Cl.
  *B23K 26/082* (2014.01)
  *B23K 26/16* (2006.01)
  *G02B 19/00* (2006.01)
  *G02B 26/10* (2006.01)

(52) U.S. Cl.
  CPC ............ *B23K 26/082* (2015.10); *B23K 26/16* (2013.01); *G02B 19/0009* (2013.01); *G02B 19/0047* (2013.01); *G02B 26/101* (2013.01)

(56) References Cited

U.S. PATENT DOCUMENTS

2014/0092372 A1 4/2014 Devoe et al.
2017/0371097 A1* 12/2017 Wu .......................... G02B 6/14

FOREIGN PATENT DOCUMENTS

| JP | 2015/179293 A | 10/2015 |
| JP | 2016/21049 A | 2/2016 |
| KR | 10-2014-0102206 A | 8/2014 |

OTHER PUBLICATIONS

Applicant: Fraunhofer Ges Forschung; "Device for Laser Machining Workpieces that are Difficult to Access"; Korean Application No. 10-2020-7037414 filed Dec. 24, 2020; Intellectual Property Office Request for the Submission of an Opinion dated Nov. 13, 2023; 11 pgs.

* cited by examiner

DEVICE FOR LASER MACHINING WORKPIECES THAT ARE DIFFICULT TO ACCESS

RELATED APPLICATIONS

The present invention is a U.S. National Stage under 35 USC 371 patent application, claiming priority to Serial No. PCT/EP2019/064334, filed on 3 Jun. 2019; which claims priority of DE 10 2018 208 752.0, filed on 4 Jun. 2018, the entirety of both of which are incorporated herein by reference.

FIELD OF THE INVENTION

The invention relates to a device for processing hard-to-access workpieces by means of an imaging optical path as well as to a corresponding method of laser processing by means of this device.

BACKGROUND OF THE INVENTION

Laser processing (welding, build-up welding, soldering, electroerosion and surface structuring) with scanning laser radiation presents substantial problems in production engineering today in case of hard-to-access processing sites. Applications requiring a large immersion depth which goes beyond the normal working distance of focusing optics, or requiring space for large-format focusing optics, can only be implemented to the disadvantage of the laser-beam focus diameter to be achieved. Materials with high thermal and electrical conductivity, like copper and aluminum, have high degrees of reflection when processed with solid-state emitters, which makes it more difficult to reach characteristic process thresholds (e. g. during deep welding). A shortening of the focal length, with a consequent reduction of the focus diameter, leads to higher intensity on the workpiece and thus to a laser process which is better reproducible and more stable. On the other hand, a higher focal length which needs to be used at the workpiece or at the welding machine due to geometric conditions, always leads, with a constant diameter of the entrance pupil, to a larger focus diameter and consequently to process instabilities which make a processing of materials, in particular highly reflective materials, more difficult. It is therefore necessary to aim at a small focus diameter by means of a short focal length, even if the workspace necessary to access the focusing optics does not allow for this.

Thermal and mechanical stability of the optical system is largely determined by the geometrical conditions of the welding optics used. Laser-beam processes using laser performances >1 kW make high demands on even temperature distribution and a low temperature gradient of the optical elements. If space-saving focusing lenses are used, the cooling surface will be reduced which is critical for temperature increase due to the absorbed radiation. Different temperatures and temperature gradients occurring locally in the optical system and, over time, during the process impair the beam quality and shift the focus plane and therefore the working distance. The optical conditions on the workpiece surface, which were thus altered, may lead to process instabilities and process outages which are to be avoided to ensure effective and high-quality processing. In assemblies according to the state of the art, the optical elements exhibit a thermal and mechanical stability which has been reduced to disadvantage, precisely at performances >1 kW.

Within the framework of automated use of the laser processing methods already mentioned, process monitoring is indispensable. For process monitoring, normally radiation emitted by the process is employed which is measured and evaluated in parallel. Via an external sensor with an offset, such process monitoring system can be installed next to the processing optics themselves and reduces accessibility to the optical elements by increasing the space occupation in the processing machines. In addition to non-coaxial process monitoring, space is further limited by the feeding in of process gases and process materials which must be fed to the processing zone via additional feeding lines.

For reducing space occupation of the processing optics and the working distance in processing machines, it is possible to guide the laser beam quite close to the actual processing zone via optical fibers. This structure cannot be used, however, with ultrashort pulse lasers since optical fibers cannot be employed due to the high energy used.

Media to be fed to the manufacturing process are normally locally fixed to the processing site. In case of a rotatory movement of the axes, the scanning geometry remains unaltered and does not participate in rotation within the global coordinate system. If, however, the scanning geometry is to be oriented always in the same direction in the Tool Center Point, the movement and rotational direction of the scanning geometry must be adapted to the axial movement. Therefore, if additional materials are used, it is not possible to vary the radiation direction and the radiation geometry.

In the state of the art, laser processing has so far been performed by means of enlarged focus lengths which have adverse effects on the size of the resulting focus diameter. Assemblies free from polymers are implemented by mechanical tensioning of the optical components. Installed lenses in filling sockets lead to increased tensions in case of thermal stresses which cause alterations in beam propagation and beam distribution. Therefore, process monitoring which is integrated in the optical path due to beam guidance can only take place non-coaxially. In case of processing with ultrashort pulse laser-beam sources, only open beam guidance is possible because of the high pulse peak power. In the state of the art, the steps of the manufacturing processes normally take place sequentially. Thus, the movement of the scanner and the linear or rotatory axial movements are mutually separated.

It is therefore desirable to have available a device for processing hard-to-access workpieces by means of a laser which allows an effective and stable process management also for laser processes with high power >1 kW, with little lateral space occupation above the processing zone on the workpiece. Such a device should also allow the feeding of media to the process, if so desired.

SUMMARY OF THE INVENTION

It is therefore an object of the invention to provide a device for processing hard-to-access workpieces by means of a laser which allows an effective and stable process management also for laser processes with high power >1 kW, or even high pulse peak powers >10 kW, with little lateral space occupation above the processing zone on the workpiece.

This object is achieved by means of a device for processing hard-to-access workpieces by means of an imaging optical path (for instance a laser beam), comprising a relay optical system with an optical axis passing through the relay optical system and with at least one first and one second relay optical group each of which has several optical elements for creating a first and a second focal length each and a focusing unit arranged behind the same seen in the optical axis in the direction of propagation of the imaging optical path, having several optical elements for creating a third focal length, as well as a beam scanner arranged before the first relay optical group seen in the propagation direction of the imaging optical path, which scanner is provided both as an entrance pupil for the imaging optical path entering the first relay optical group and for at least deflecting the imaging optical path in relation to the optical axis; the first relay optical group being adapted to focus the imaging optical path in an intermediate focus located separately from the first and the second relay optical groups between the first and the second relay optical group, and the second relay optical group being adapted to image the intermediate focus for exit from the relay optical system, and the focusing unit being adapted to focus the imaging optical path in a focus of the device on a focus plane for processing the workpiece; a distance between the entrance pupil and one end of the device in the direction of the imaging optical path being larger than two times, preferably four times, even more preferably eight times the diameter of the largest optical element of the relay optical system.

In direct focusing, the problem occurs that a spatial separation of the entrance pupil and the processing site entails a scaling of the overall system. In particular, if the processing space is enlarged, the apertures of the lenses must be accordingly enlarged as well since a respective numerical aperture is necessary to achieve a desired spot size. To achieve an overall diameter of the optical system which is small enough, with a large processing space and large overall length, a relay optical system is used. The term "relay optical system" designates a group of optical elements which invert the image and elongate the optical system. The optical elements used can comprise, for instance, conventional lenses and achromatic lenses. Relay optical systems create one or more intermediate focus planes in the beam path within the relay optical system. The final imaging of the entrance pupil is only achieved in the focus of the device. To provide the relay optical system with high laser performances larger than 1 kW, for instance up to 10 kW, with pulsed lasers also more than 10 kW, the relay optical system according to the invention was separated in two parts, the first relay optical group with respective first optical elements and the second relay optical group with respective second optical elements, which are sufficiently spaced from one another to place the intermediate focus outside each one of the relay optical groups; in this case between the first and the second relay optical group. The first relay optical group creates the intermediate focus which is imaged by the second relay optical group to the infinite. Here, firstly, the intermediate focus is created between the two groups, and secondly, the entrance pupil is imaged behind the relay optical system. By means of the focusing unit as the final focusing optical means, comprising suitable optical elements (for instance conventional lenses and achromatic lenses), the imaging optical path (for instance a laser beam) is focused in the focus of the device on the workpiece. The focal lengths of the two components (relay optical system and focusing unit) are to be selected such that the desired aspect ratio of the entire optical system, as a ratio of overall length to diameter, is larger than two. In this manner, high power densities on the surfaces of the optical elements or in the optical elements, which would lead to a destruction of the component, can be avoided. In a preferred embodiment, the ratio of overall length to diameter is larger than four, preferably even larger than eight. The distance can be, for instance, 300 mm to 500 mm with a diameter of the largest optical element of 35 mm. In case of such a distance of more than 10-fold the diameter of the largest optical element of the relay optical system, particularly high cw power densities of up to 10 kW and pulse powers >10 kW can be focused on a workpiece through the device without causing damage in the device. The diameter of the largest optical element can be between 30 mm and 50 mm.

Thus, the device according to the invention is suitable for working with the high pulse power and the high pulse energies of the laser pulses which are required for certain workpieces, and can work reliably over a long time with these parameters.

The entrance pupil lies here in the mirror plane of the beam scanner. It would be identical with an aperture stop if the latter were positioned before the imaging elements in the beam direction. The exit pupil is the image of the entrance pupil when the light beam leaves the device at the end of the device which faces the focus plane of the device. The focus of the device is the focus of the light beam in the focus plane after the light beam has left the device.

The purpose of the beam scanner is to deflect the imaging optical path at least in relation to the optical axis. In this manner, the focus of the device can move on a focal plane around the focal point which would form the focus of the device if the position of the imaging optical path would coincide with the optical axis. By locally varying the focus of the device by deflection of the imaging optical path, caused by the beam scanner, the entire surface of the workpiece can be flexibly worked within the frame defined by the optical elements of the device. For this purpose, the beam scanner is arranged before the relay optical system in the propagation direction of the imaging optical path. The propagation direction of the imaging optical path defines the direction of the beam path of the imaging optical path (laser light) from the laser through the optical components up to the workpiece. The beam scanner can be a two-dimensional scanner or a three-dimensional scanner. Two-dimensional scanners can vary the position of the imaging optical path on a plane, in this case, for instance, the plane orthogonal to the optical axis; three-dimensional scanners can vary the position of the imaging optical path in an additional spatial direction. By arranging the components of the device according to the invention accordingly, the working plane (on the workpiece) and the position of the beam scanner can be arranged spaced from one another with a limited lateral extension of the optical system used. Thus, the device according to the invention can be operated, with limited spatial access possibilities to the workpiece, with a large space between the beam scanner and the workpiece, with a large immersion depth of the imaging optical path focused on the workpiece, with a small focus diameter and a large scanning field. In this manner, for instance, a working of the interior of pipes and of housings is possible with a large immersion depth.

In another embodiment, an additional beam scanner is arranged in the optical path between the first relay optical group and the second relay optical group so as to either again modify the optical path to be imaged or to couple another beam in addition to the optical path which already passes through the first relay optical group, or to integrate image monitoring and process monitoring in the device.

Here, for instance, the first and second focal lengths of the relay optical system can be selected such that a distance between the entrance pupil and the end of the device in the direction of the imaging optical path is larger than double the diameter of the largest optical element of the relay optical system. In this way, damages due to very high power densities, which would otherwise lead to a destruction of the components, on the surfaces of the optical elements, or in the optical elements, respectively, can be avoided.

The workpiece to be processed can be any workpiece able to be processed by radiation. The laser performance necessary for processing depends on the workpiece material and on the desired type of processing. For instance, the device according to the invention can be used for laser welding, laser build-up welding, laser soldering, laser cutting, laser abrasion, laser drilling, laser modification or laser surface structuring.

Suitable light sources for generating the imaging optical path can be, for instance, Nd:YAG lasers or other industrial solid-state lasers, diode lasers, $CO_2$ lasers or fiber lasers. Performances of up to 5 kW or more can be achieved by means of the abovementioned optical elements made of, for example, diamond material.

This device allows the processing of hard-to-access workpieces by means of a laser and allows for laser processes with high average performances >1 kW and pulse powers >1 kW or >10 kW, respectively, an effective stable process control with little lateral space occupation above the processing zone on the workpiece.

In one embodiment, an optical shifting element is arranged before the beam scanner in the imaging optical path, seen in the propagation direction of the imaging optical path, which shifting element allows continuous variation of the focus plane in parallel to the optical axis. The shifting element (also called a Z-shifter) can be embodied as a two- or multiple-lens telescope or a different type of system intended for the alteration of beam diameter and beam divergence. For at least one of the lenses, their position can be altered in the propagation direction of the imaging optical path, thus changing the position of the focus plane. The shifting element minimizes, for example, the aberration of the optical system consisting of relay optical system and focusing unit. In designing the shifting element, it can be taken into account that a change in focal length of the overall system leads to a variation in spot size which should be minimized depending on the processing mode for the workpiece.

In another embodiment, the shifting element is arranged outside the optical axis defined by the relay optical system so that the imaging optical path which has passed through the shifting element impinges on the beam scanner at an angle to the optical axis and the beam scanner is adapted to deflect the imaging optical path along the optical axis; preferably, the angle is 90°. In this way, the device according to the invention can be built more compact with the same overall length; that is, at a lower height above the focus plane of the focus of the device.

In another embodiment, the beam scanner comprises a system of mirrors, at least for deflecting the imaging optical path in relation to the optical axis. A two-dimensional beam scanner comprises two mirrors by means of which the angle between the imaging optical path exiting from the beam scanner and the optical axis can be altered on the plane orthogonal to the optical axis. The mirrors form the entrance pupil for the downstream relay optical system.

In another embodiment, the beam scanner, associated with the shifting element, is a three-dimensional beam scanner whose system of mirrors also makes it possible to vary the imaging optical path along the optical axis. In this manner, the imaging properties of the relay optical system and the focusing unit as well as the focus plane can be additionally varied.

In another embodiment, the device is configured such that a process monitoring beam passes through the device for detection through at least one optical sensor, coaxially with the optical axis. The term "process monitoring beam" designates the radiation emitted by the process and can be used for process monitoring. The optical sensor can be arranged at a suitable site in the process monitoring beam, or the process monitoring beam is guided out of the device at a suitable point and is guided towards the sensor. If the latter is the case, the sensor can be arranged at a large distance from the optical axis of the device. The sensor allows process control of the working process, the reflected light allowing a direct feedback from the workpiece to the controller. The sensor can be any sensor suitable for detecting light of a specific wavelength.

In another embodiment, the sensor is connected to a control unit adapted for controlling processing of the workpiece on the basis of a radiation of the process monitoring beam which is detected by the sensor. The radiation emitted by the process can be measured and evaluated in parallel to process monitoring, improving process control. The control unit can be a processor or a connected computer on which a respective control program is installed and executed by the same.

In another embodiment, at least the beam scanner, the relay optical system and the focusing unit are arranged in a tube which can be embodied as a linear tube, a tube with one or more kinks or a movable tube, the optical elements of beam scanner, relay optical system and focusing unit being arranged suitably for guiding the imaging optical path through the respective tube. The tube forms the exterior housing for retaining the abovementioned components and can be made of any material suitable for this purpose, preferably of metal. A linear tube forms a simple arrangement, but with a maximum height (length) above the focus plane of the focus of the device. A tube with kinks or, even more, a movable tube reduces this height for the same length; however, the arrangement of the respective optical elements of the components of the device according to the invention is more complex. Depending on the application and the available space above the workpiece, either a linear tube, a tube with kinks or a movable tube can be advantageous.

In another embodiment, the device comprises a light source for generating the imaging optical path. As an alternative, an external light source can be connected to the device according to the invention for generating the imaging optical path. The light source can be a laser from the group consisting of Nd:YAG laser, solid-state laser, diode laser, fiber laser or $CO_2$ laser, or the imaging optical path is a single beam, a bundle of beams or any form of beam from an image source such as e. g. Axicon, diffractive optical element, micro mirror array or spatial light modulator, or a combination thereof etc. The lasers are suitable for laser processing of workpieces. The light in the imaging optical path can have a wavelength between 157 nm and 10600 nm. Depending on the type of processing and the material of the workpiece, wavelengths in the visible range, in the infrared or the deep infrared range can be used.

In another embodiment, the second relay optical group and the focusing unit form a single integrated optical group so that no interface with the collimated beam exists between the second relay optical group and the focusing unit. This allows further improvement of the device.

In another embodiment, the device comprises at least one integrated feeding device for feeding in additional materials in the form of wire, powder, belt or gas, and/or at least one integrated aspiration device for removing process emissions by aspiration. Some working processes require the feeding of additional materials into the hot area around the focus of the device. Due to compact design of the optical components of the device according to the invention, corresponding feeding lines for additional materials can be guided to the working point without greater effort or impairment of the optical properties. The same applies to any aspiration of process emissions, which emissions might impair the working process or present a danger to the environment. The device according to the invention thus additionally allows the feeding of media to the working process.

In another embodiment, at least the deflection of the imaging optical path by means of the beam scanner is synchronized with the feeding of additional materials by means of the feeding device. In this manner, the feeding of additional materials can follow the focus of the device, which moves inside the focus plane, and can precisely and reliably provide the required amount of additional materials for all positions of the focus of the device. The deflection of the imaging optical path by the beam scanner can also be synchronized with other axes of the motion system or of the processing system, respectively.

In another embodiment, the device is free from polymers. This makes the device more heat-resistant and achieves a longer service life and better reliability, with less maintenance effort, for processing with high pulse peak powers and high average performances.

In another embodiment, at least some of the optical elements are suspended in spring elements. This allows thermal balancing of the optical system through high laser performances and ensures a longer service life and better reliability with less maintenance effort.

Furthermore, the invention relates to a method of processing hard-to-access workpieces by means of the device according to the invention, comprising a relay optical system having an optical axis passing through the relay optical system and at least one first and one second relay optical group with several optical elements each for generating one first and one second focal length and a focusing unit arranged behind the same, seen in the optical axis in the propagation direction of the imaging optical path, with several optical elements for generating a third focal length, as well as a beam scanner arranged before the first relay optical group, seen in the propagation direction of the imaging optical path; comprising guiding the imaging optical path through the beam scanner as the entrance pupil into the first relay optical group,
 focusing the imaging optical path through the first relay optical group in an intermediate focus which is separate from the first and the second relay optical group and located between the first and the second relay optical group,
 imaging the intermediate focus through the second relay optical group for exit from the relay optical system,
 focusing the imaging optical path through the focusing unit in a focus of the device on a focus plane for processing the workpiece, and
 processing the workpiece by means of at least one deflection of the imaging optical path in relation to the optical axis to move the focus or a focus array of the device on the focus plane by means of the beam scanner, a distance between the entrance pupil and an end of the device in the direction of the imaging optical path being larger than two times, preferably four times, even more preferably eight times the diameter of the largest optical element of the relay optical system.

This method allows the processing of hard-to-access workpieces by means of a laser and also allows for laser processes with high performances >1 kW an effective and stable process control with little lateral space occupation above the processing zone on the workpiece.

The embodiments listed above can be used individually or in any combination for implementing the device and the method according to the invention.

SHORT DESCRIPTION OF FIGURES

These and other aspects of the invention are shown in detail in the figures as follows.

DETAILED DESCRIPTION OF EMBODIMENTS

Figure 1:
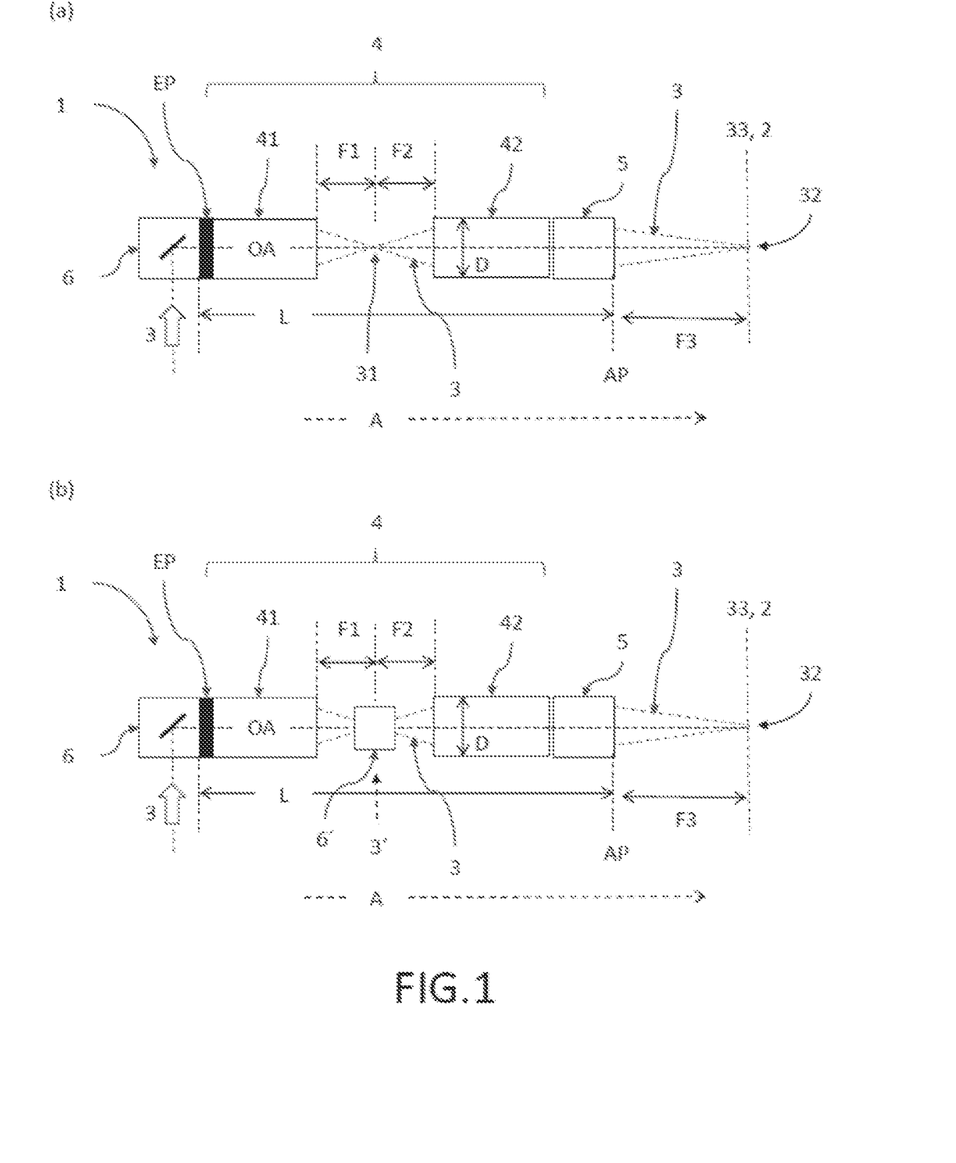
FIG. 1: schematic view of two embodiments (a) and (b) of the device according to the invention.

FIG. 1a is a schematic view of an embodiment of the device 1 according to the invention for processing hard-to-access workpieces 2 by means of an imaging optical path 3, here and in the following figures, by way of example, a laser beam. The device comprises a relay optical system 4 with an optical axis OA passing through the relay optical system 4. The relay optical system 4 comprises at least one first and one second relay optical group 41, 42, each with a plurality of optical elements 411, 421 for generating a respective first and a second focal length F1, F2. Other than shown in FIGS. 1a,b, the main planes for the focal lengths F1, F2 can also lie within the respective relay optical groups 41, 42. Behind the same, seen in the optical axis OA, in the propagation direction A of the laser beam 3, a focusing unit 5 with a plurality of optical elements 51 for generating a third focal length F3 is arranged. Other than shown in FIGS. 1a,b, the main planes for the focal length F3 can also lie within the focusing unit 5. Before the first relay optical group 41, seen in the propagation direction A of the laser beam 3, a beam scanner 6 is arranged, provided both as an entrance pupil EP for the laser beam 3 entering the first relay optical group 41 and at least for deflection V1 of the laser beam 3 in relation to the optical axis OA. The first relay optical group 41 is configured to focus the laser beam 3 in an intermediate focus 31 sufficiently separated from the first and the second relay optical group 41, 42 and located between them. The second relay optical group 42 is adapted to image the intermediate focus 31 for exit from the relay optical system 4. The first and the second focal length F1, F2 of the relay optical system 4 are selected such that a distance L between the entrance pupil EP and the exit pupil AP is larger than twice the diameter D of the largest optical element 411, 421 of the relay optical system 4. In other embodiments, this distance L can also be larger than four times, eight times or ten times the diameter D. The diameter D can be, for instance, between 30 mm and 50 mm. The focusing unit 5 is adapted for focusing the laser beam or the laser beam bundle 3 into a focus or a focus array, respectively, of the device 32 on a focus plane 33 for processing of the workpiece 2. The device 1 can be free from polymers and allows processing of hard-to-access workpieces 2 by means of a laser, ensuring stable process control of laser processes with high performances >1 kW, with little lateral space occupation above the processing zone on the workpiece 2. The device 1 can be used for laser welding, laser build-up welding, laser soldering, laser cutting, laser abrasion, laser drilling, laser-beam modification or laser surface structuring.

In the other embodiment shown in FIG. 1b, an additional beam scanner 6' is arranged in the optical path 3 between the first relay optical group 41 and the second relay optical group 42, so as to either again modify the optical path 3 to be imaged or to couple another beam 3' in addition to the optical path 3 passing through the first relay optical group 41 or to integrate image monitoring and process monitoring in the device 1.

Figure 2:
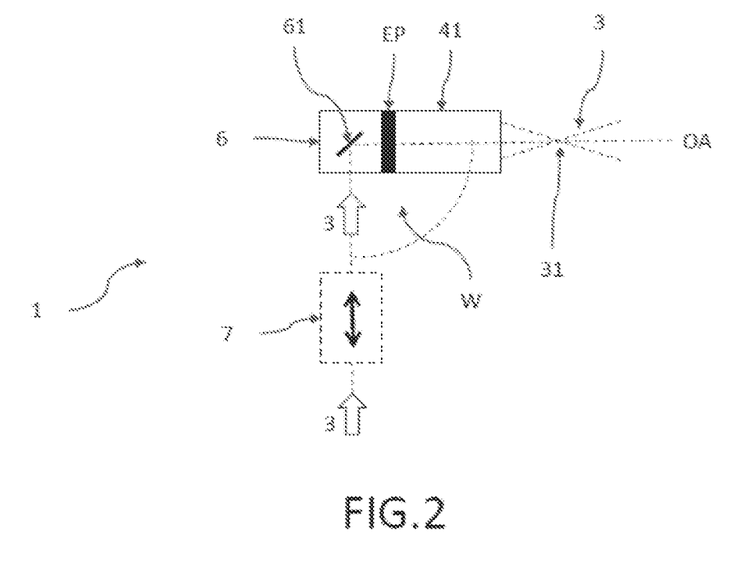
FIG. 2: schematic section view of a different embodiment of the device according to the invention with shifting element.

FIG. 2 is a schematic section view of an embodiment of the device 1 according to the invention in FIG. 1a with an added shifting element 7 (presented as continuous line and as a dashed line in two possible arrangements) which is arranged in the laser beam 3 before the beam scanner 6, seen in the propagation direction A of the laser beam 3. This shifting element allows a continuous variation of the focus plane 33. The shifting element 7 as an additional optical element is arranged outside the optical axis OA defined by the relay optical system 4 so that the laser beam 3 which has passed through the shifting element 7 impinges upon the beam scanner 6 at an angle W with respect to the optical axis OA and the beam scanner 6 is adapted to deflect the laser beam 3 along the optical axis OA (in this case, with a mirror 61). The angle W is preferably 90° so as to reduce the height of the device above the workpiece with the length L of the device remaining the same. The shifting element 7 (also called a Z-shifter) can be embodied as a two-lens or multiple-lens telescope or a different system for beam size alteration and divergence alteration. The position of at least one of the lenses of the shifting element 7 (not shown here in detail) can be changed in the propagation direction A of the laser beam 3 and therefore the position of the focus plane 33. The telescope 7 corrects, for instance, the aberrations of the optical system consisting of relay optical system 4 and focusing unit 5. In designing the shifting element 7, it can be taken into account that a change in focal length of the overall system leads to a variation in spot size in the focus of the device 32 which should be minimized depending on the processing mode for the workpiece 2. Here as well, in the same way as in FIG. 1b, an additional beam scanner 6' can be arranged in the optical path 3.

Figure 3:
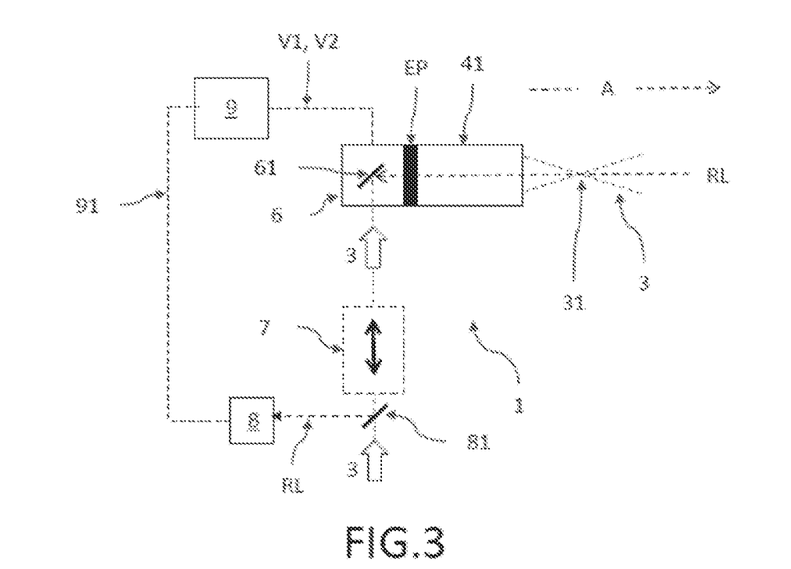
FIG. 3: schematic section view of another embodiment of the device according to the invention with sensor and control unit.

FIG. 3 shows a schematic section view of an embodiment of the device 1 according to the invention with sensor 8 and control unit 9. Herein, the beam scanner 6 comprises a system of mirrors 61 at least for deflection V1 of the laser beam 3 in relation to the optical axis OA (two-dimensional scanner). For better comprehensibility, only one mirror is shown. However, two-dimensional beam scanners 6 can also comprise multiple mirrors 61. In combination with the shifting element 7 (Z-shifter), the beam scanner 6 can also act as a three-dimensional beam scanner, allowing an additional variation V2 of the laser beam 3 along the optical axis OA. In the embodiment shown here, an additional mirror 81 is arranged before the shifting element 7, seen in the propagation direction of the laser beam 3, which mirror is semi-transparent. The mirror 81 ensures that the process monitoring beam RL to an optical sensor 8 is uncoupled from the optical path so that the light reflected back from the workpiece 2 can be detected by the sensor 8 as a process monitoring beam RL. The process monitoring beam at least partially impinges, starting from the workpiece 2 in the reverse beam direction, upon the device according to the invention and passes through it coaxially in the direction opposite to the propagation direction of the laser beam 3 back to a point where the process monitoring beam RL is suitably (here by means of mirrors 81) uncoupled from the device and guided to at least one sensor 8. For an automatic control of the working process, the sensor 8 is suitably connected to a control unit 9 via data lines 91 so that the control unit 9 can control processing of the workpiece 2 on the basis of the light RL detected by the sensor 8 by accordingly controlling the beam scanner 6 for variation V1, V2 of the focus of the device 32. Here as well, in the same way as in FIG. 1b, an additional beam scanner 6' can be arranged in the optical path 3.

Figure 4:
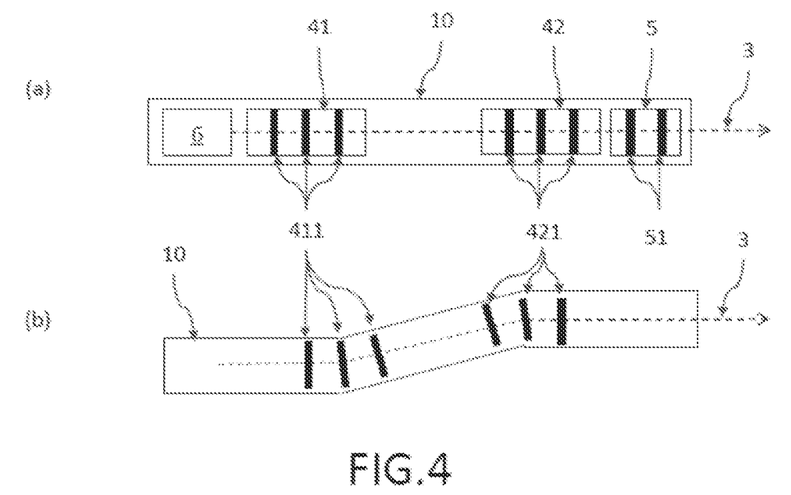
FIG. 4: schematic view of another embodiment of the device according to the invention, arranged in (a) a linear tube and (b) a tube with kinks.

FIG. 4 is a schematic view of an embodiment of the device 1 according to the invention, arranged in (a) a linear tube 10 and (b) a tube 10 with kinks. Here, at least the beam scanner 6, the relay optical groups 41, 42 and the focusing unit 5 are arranged in the tube 10, the optical elements 411, 421, 51, 61 of the beam scanner 6, the relay optical groups 41, 42 and the focusing unit 5 being arranged suitably for guiding the laser beam 3 through the respective tube 10.

Figure 5:
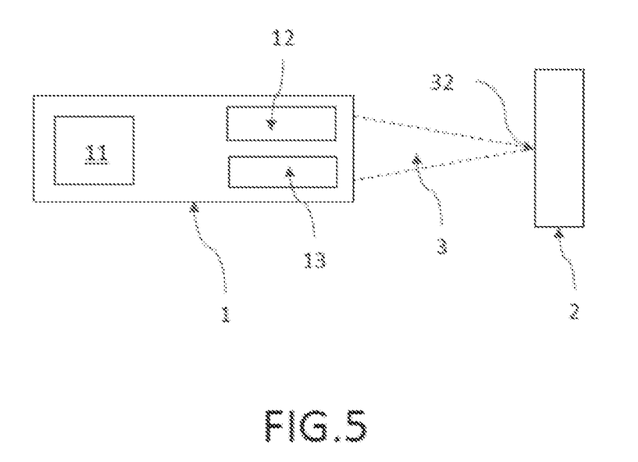
FIG. 5: schematic view of another embodiment of the device according to the invention with laser light source as well as feeding unit and aspiration unit.

FIG. 5 is a schematic view of an embodiment of the device 1 according to the invention with a laser light source 11 as well as a feeding device 12 and an aspiration device 13. The laser light source 11 can emit laser light, for instance, at a wavelength between 157 nm and 10600 nm for processing the workpiece 2. The laser light source 11 can be a laser selected from the group consisting of Excimer laser, Nd:YAG laser, solid-state laser, diode laser, fiber laser or $CO_2$ laser. In addition, the device 1 can comprise at least one integrated feeding device 12 for feeding in additional materials in the form of wire, powder, belt or gas, and/or at least one integrated aspiration device 13 for aspirating process emissions. Some working processes require the feeding in of additional materials into the hot area around the focus of the device. The same applies to any aspiration of process emissions which might otherwise impair the working process or present a risk to the environment. The deflection V1 of the laser beam by means of the beam scanner 6 can be synchronized with the feeding of additional materials through the feeding device 12.

Figure 6:
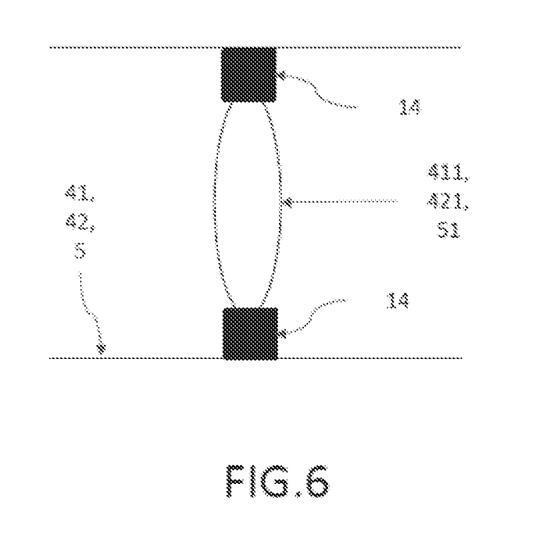
FIG. 6: schematic view of a suspension of the optical elements in spring elements.

FIG. 6 is a schematic view of a suspension of the optical elements 411, 421, 51 in the spring elements 14 using a suspended optical element in the form of a lens as an example. This allows a thermal balance of the optical system under high thermal stresses due to high laser performances, ensuring additionally a longer service life of the device 1 according to the invention and better reliability with less maintenance effort.

Figure 7:
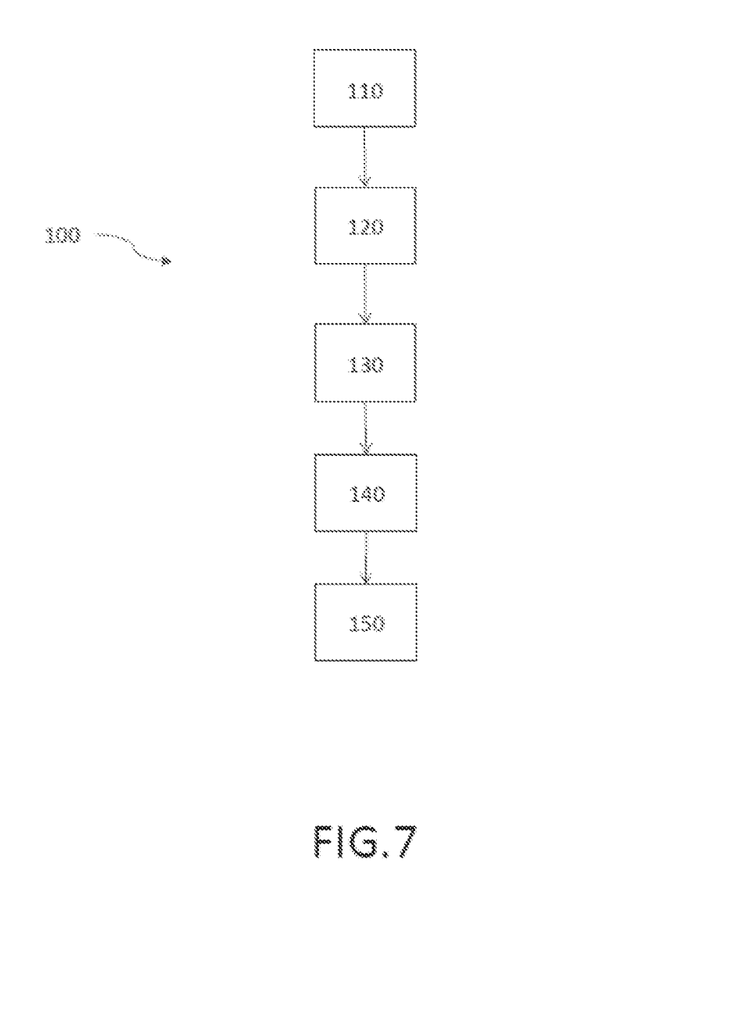
FIG. 7: schematic view of an embodiment of the method according to the invention.

FIG. 7 is a schematic view of an embodiment of the method according to the invention for processing hard-to-access workpieces 2 using the device 1 according to the invention (see also FIGS. 1-6), comprising a relay optical system 4 with an optical axis OA passing through the relay optical system 4 and with at least one first and one second relay optical group 41, 42, each having a plurality of optical elements 411, 421 for generating a respective first and a respective second focal length F1, F2, and a focusing unit 5 arranged behind the same seen in the optical axis (OA) in the propagation direction A of the laser beam 3, the focusing unit 5 having a plurality of optical elements 51 for generating a third focal length F3; and a beam scanner 6 arranged before the first relay optical group 41, seen in the propagation direction A of the laser beam 3; comprising     guiding 110 the laser beam 3 through the beam scanner 6 as the entrance pupil EP into the first relay optical group 41,     focusing 120 the laser beam 3 through the first relay optical group 41 in an intermediate focus 31 located between the first and the second relay optical group 41, 42 separately from the first and the second relay optical group 41, 42,     imaging 130 the intermediate focus 31 through the second relay optical group 42 for exit from the relay optical system 4,     focusing 140 the laser beam or laser beam bundle 3 through the focusing unit 5 in a focus of the device 32 on a focus plane 33 for processing the workpiece 2, and     processing 150 the workpiece 2 by means of at least one deflection V1 of the laser beam 3 in relation to the optical axis OA for moving the focus or the focus array or the intermediate image of the device 32, which can take any shape, on the focus plane 33 by means of the beam scanner 6, a distance L between the entrance pupil EP and an end of the device in the direction of the laser beam AP being larger than two times, preferably four times, even more preferably eight times the diameter D of the largest optical element 411, 421 of the relay optical system 4.

The embodiments shown here are only examples of the present invention and are therefore not to be understood as limiting. Alternative embodiments considered by the person skilled in the art are equally comprised by the scope of protection of the present invention.

LIST OF REFERENCE NUMERALS

1 device according to the invention
2 workpiece to be processed
3 imaging optical path, e. g. a laser beam
3' additional beam
31 intermediate focus
32 focus of the device
33 focus plane
4 relay optical system
41 first relay optical group
411 optical elements of first relay optical group
42 second relay optical group
421 optical elements of second relay optical group
5 focusing unit
51 optical elements of focusing unit
6, 6' beam scanner
61 mirror
7 shifting element (Z shifter)
8 optical sensor
81 additional semitransparent mirror
9 control unit
91 data line
10 tube
11 laser light source
12 feeding device for additional materials to be fed to the working process
13 aspiration device for process emissions
14 spring elements for suspending the optical elements
100 method according to the invention
110 guiding the imaging optical path into the relay optical system by means of a beam scanner
120 focusing the imaging optical path in an intermediate focus
130 imaging the intermediate focus on the exit pupil
140 focusing the imaging optical path in a focus of the device
150 processing of workpiece
A propagation direction of imaging optical path
AP end of the device in the direction of the imaging optical path (facing the focus of the device)
D diameter of the largest optical element of the relay optical system
EP entrance pupil
F1 first focal length of first relay optical group
F2 second focal length of second relay optical group
F3 third focal length of focusing unit
L distance between entrance and exit pupil
OA optical axis
RL process monitoring beam reflected back by workpiece
V1 deflection of imaging optical path in relation to optical axis
V2 variation of imaging optical path along optical axis
W angle between imaging optical path after exit from shifting element and optical axis

The invention claimed is:

1. A device for processing hard-to-access workpieces by means of an imaging optical path, comprising a relay optical system with an optical axis passing through the relay optical system and with at least one first relay optical group, each having a plurality of first optical elements for generating a first focal length, and at least one second relay optical group, each having a plurality of second optical elements for generating second focal length, and a focusing unit arranged in the optical axis in a propagation direction of the imaging optical path with a plurality of optical elements for generating a third focal length which is formed after the second focal length, wherein a beam scanner arranged before the first relay optical group seen in the propagation direction of the imaging optical path, which beam scanner is provided both as an entrance pupil for the imaging optical path entering the first relay optical group and for at least controllably deflecting the imaging optical path in relation to the optical axis, the first relay optical group being adapted to focus the imaging optical path in an intermediate focus located separately from the first and the second relay optical group between the first and the second relay optical group, and the second relay optical group being adapted for imaging the intermediate focus for exit from the relay optical system and the focusing unit being adapted for focusing the imaging optical system in a focus of the device on a focus plane for processing of the workpiece,     whereby a distance between the entrance pupil and an end of the device in the direction of the imaging optical path is larger than the diameter of the largest optical element of the relay optical system, an optical shifting element being arranged in the imaging optical path before the beam scanner in the propagation direction of the imaging optical path, which shifting element allows continuous variation of the focus plane.

2. The device according to claim 1, wherein the shifting element is arranged outside the optical axis defined by the relay optical system so that the imaging optical path which has passed through the shifting element impinges upon the beam scanner at an angle to the optical axis and the beam scanner is adapted for deflecting the imaging optical path along the optical axis.

3. The device according to claim 2, wherein the angle is 90°.

4. The device according to claim 1, characterized in that the beam scanner comprises a system of mirrors at least for deflecting the imaging optical path in relation to the optical axis.

5. The device according to claim 4, characterized in that in combination with the shifting element, the beam scanner is a three-dimensional beam scanner whose system of mirrors also allows variation of the imaging optical path along the optical axis.

6. The device according to claim 4, characterized in that for detection, a process monitoring beam passes coaxially with the optical axis through the device through at least one optical sensor.

7. The device according to claim 6, characterized in that the sensor is connected to a control unit adapted for controlling the processing of the workpiece on the basis of a radiation of the process monitoring beam, detected by the sensor.

8. The device according to claim 1, characterized in that at least the beam scanner, the relay optical system and the focusing unit are arranged in a tube, where the tube can be formed as a linear tube, a tube with one or more kinks or a movable tube, the optical elements of beam scanner, relay optical system and focusing unit being arranged suitably for conducting the imaging optical path through the respective tube.

9. The device according to claim 1, characterized in that the device comprises a light source for generating the imaging optical path with a wavelength preferably between 157 nm and 10600 nm; the light source is a laser from the group of Nd:YAG laser, solid-state laser, diode laser, fiber laser or $CO_2$ laser, or the imaging optical path is a single beam, a beam bundle or any form of beam from an image source.

10. The device according to claim 1, characterized in that the second relay optical group and the focusing unit form a mutually integrated common optical group.

11. The device according to claim 1, characterized in that the device comprises at least one integrated feeding device for feeding in additional materials in the form of wire, powder, belt or gas, and/or at least one integrated aspiration device for aspirating process emissions.

12. The device according to claim 11, characterized in that at least the deflection of the imaging optical path is synchronized with the feeding in of additional materials through the feeding device by means of the beam scanner.

13. The device according to claim 1, wherein the device is free from polymers.

14. The device according to claim 1, characterized in that at least some of the optical elements are suspended in spring elements.

15. The device according to claim 1, characterized in that between the first relay optical group and the second relay optical group, an additional beam scanner is arranged in the optical path.

16. Use of a device according to claim 1 for laser welding, laser build-up welding, laser soldering, laser cutting, laser abrasion, laser drilling, laser modification or for laser surface structuring.

* * * * *